United States Patent Office 3,039,710
Patented June 19, 1962

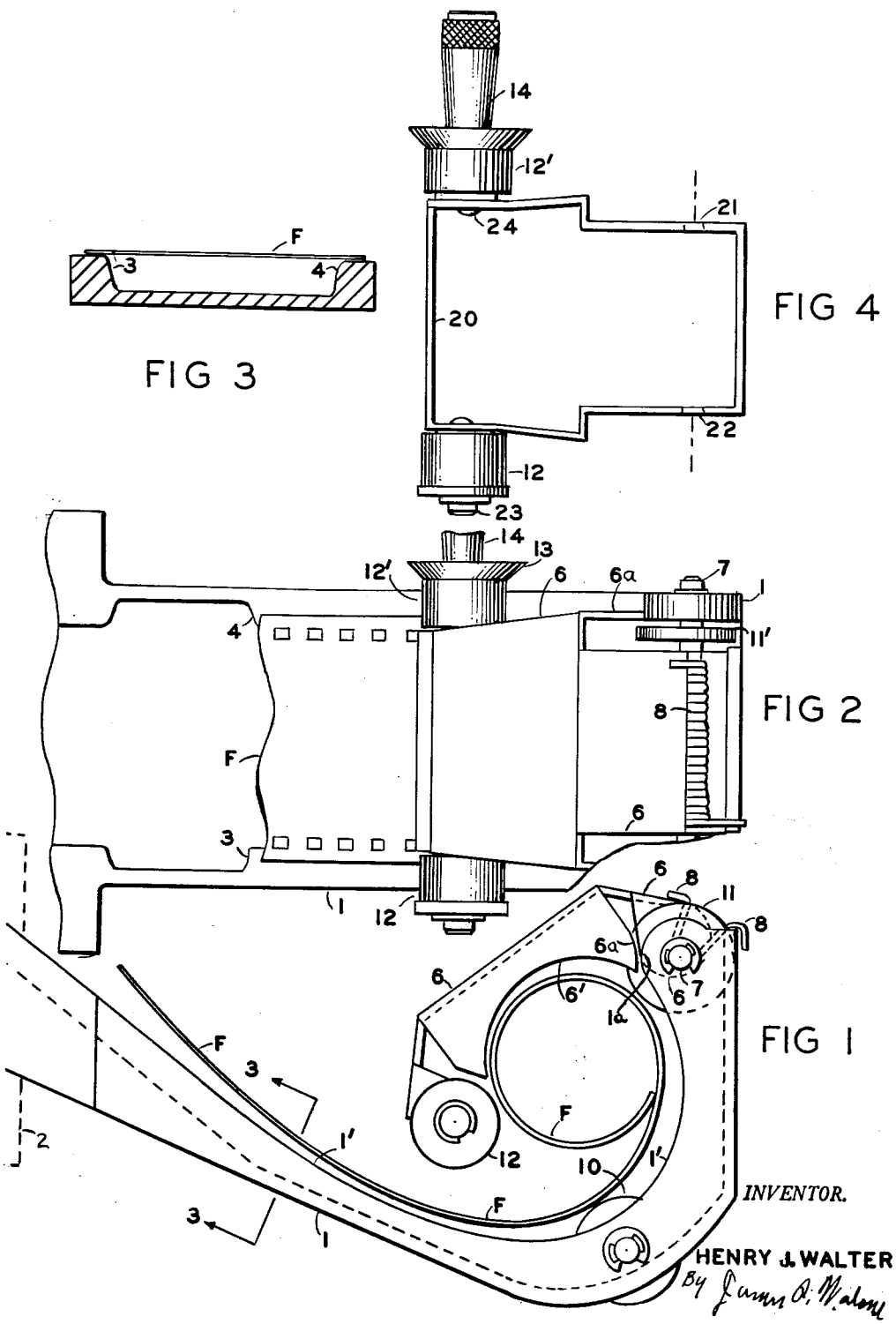

3,039,710
FILM TAKEUP MEANS
Henry J. Walter, Bethpage, N.Y., assignor to
Viewlex, Inc., Long Island City, N.Y.
Filed Nov. 19, 1959, Ser. No. 854,060
1 Claim. (Cl. 242—55.11)

This invention relates to film takeup means on a projector and more particularly to such means not requiring any threading of the film on the takeup means.

One of the difficulties with operating projectors is that it is necessary to thread the film into a takeup sprocket or reel. This is especially time consuming with the so-called film strips which are very commonly used for educational work, lectures, etc., which contain a number of slides on the film strip. The film strip for this use is generally only ten or twelve feet long and is commonly packaged in small cans without any reel. Therefore if this type film is run and then taken up on a spool or reel it must then be manually removed from the spool or reel in order to be fitted into the original can for shipping or mailing or other transportation.

Various automatic threading devices have been proposed using takeup rolls or sprockets with some of the rolls using adhesive means on their surface. These devices have not been very satisfactory especially for short lengths of film which do not use a reel in the first place.

The present invention solves these difficulties by providing a guide arm which curves downwardly and outwardly from the film projecting position and then upwardly. It has a spring loaded extension arm for the purpose of guiding the film into a compact coil which may be easily removed. No reel or other driven takeup device is used. The interior surface of the guide arm has a curvature chosen to coil the film and the extension arm has a curvature of smaller radius than the first curvature to insure the proper starting of the film coil. The extension member is spring loaded at the end of the first arm so that it can expand as the coil grows larger. The coil is merely pushed into the aperture formed by the curved guide means which are open at the side so that the film may be easily removed by hand. The guide means have edge rollers and raised edges which are positioned to protect the central film portion from scratching.

Accordingly, a principal object of the invention is to provide new and improved film takeup means.

Another object of the invention is to provide new and improved film takeup means without any wheels or sprockets.

Another object of the invention is to provide new and improved film takeup means which is fully automatic and does not require any threading of the film on a takeup reel.

Another object of the invention is to provide new and improved film takeup means for short lengths of film wherein the coiled film may be easily removed from the takeup means.

Another object of the invention is to provide new and improved film takeup means having edge rollers for guiding the film to protect the interior surface of the film from scratching.

Another object of the invention is to provide new and improved film takeup means comprising a first guide arm having a first interior curved surface, and a spring loaded extension member mounted on said guide arm, said extension member having an interior curved surface of lesser radius than said first arm curved surface, said guide arm and said extension members having edge rollers mounted thereon which are adapted to contact the edges of the film to thereby protect the central portion of the film from scratching.

These and other objects of the invention will be apparent from the following specification and drawings, of which
FIG. 1 is a side view of the embodiment of the invention,
FIG. 2 is a top view of the embodiment of FIG. 1,
FIG. 3 is a sectional view taken along the lines 3—3 of FIG. 1, and
FIG. 4 is a detail view of the extension member.

Referring to the figures the invention generally comprises a first lower guide arm 1 which is adapted to be connected to the body of a projector 2 in a conventional manner just below the projection axis. The film F is fed past the projection axis by sprockets in conventional manner and it then falls upon the upper surface of the guide arm 1. As shown in FIG. 3, the interior surface of the guide arm 1 has raised edges 3 and 4 upon which the edges of the film containing the sprocket holes ride, so that the central portion of the film does not come into mechanical contact with the guide arm and is therefore prevented from scratching.

The guide arm 1 extends generally downwardly and outwardly from the projector for several inches, for instance, 5 or 6 inches, which dimension is not critical. The arm then curves upwardly, the interior surface 1' of the arm having a substantially circular curvature for the purpose of guiding the film into a loop.

At the upper end of the lower arm 1 is pivotally mounted an extension member 6 which may be mounted by means of a pin or axle 7 suitably mounted by retaining rings in mounting holes in the arm 1 and member 6. The extension member is spring loaded down or counter-clockwise in FIG. 1 by means of the spring 8 which may be mounted on the axle 7, the ends of the spring bearing on top of the arm 1 and extension member 6. The extension member 6 has a curved interior surface 6' which has a smaller radius than the curved interior surface of the first arm and the extension member preferably has raised interior edges similar to edges 3 and 4 of the first guide arm.

In order to protect the film from scratches on the viewing portion two sets of edge rollers 10 and 11 are mounted on the arm 1 to contact the film edges, the first set of rollers 10 one at each edge of the film being mounted at substantially the point where the first guide arm starts to curve upward, and the second set of rollers 11, 11' being mounted at the top of the upper portion of the guide arm 1 and on the same axle 7 as the pivotal mounting of the extension member 6. The arm 1 is preferably of molded plastic, and is recessed or apertured to accommodate the rollers. Another set of rollers 12, 12' is mounted at the end of the extension member 6, the surface of the rollers extending slightly inside the interior curvature 6' of the extension 6. The rollers on arm 1 are all rotatably mounted and are relatively narrow, being arranged to contact only the edge portions of the film which normally contain the sprocket holes. The rollers 12, 12' may be bevelled as at 13 to prevent the film from drifting sideways. Lifting knob 14 is preferably provided at the end of the extension so the extension member may be easily lifted to permit easy removal of the coiled film.

FIG. 4 is a detail view of the frame 20 of extension member 6 which is pivotally mounted by passing axle 7 through the mounting holes 21, 22. Rollers 12 and 12' are mounted on studs 23 and 24 set in the frame 20, and held thereon by retaining rings or other means. The cover of member 6 is then placed on the channel 20.

In operation, the leading edge of the film F is fed down along the surface of the guide arm 1 and will follow the interior curve 1' and then the interior 6' of the extension member and will then ride up on and past the rollers 12 to form a coil, as shown in FIG. 1. The handling of the leading edge of the film is quite important as the leading edge must be fed in such a manner that it is under control and will not curl or curve in an undesirable direction. The extension member 6 is spring loaded in the position shown in FIG. 1 the position being determined by the surface 6a of the extension member bearing against the curved surface 1a of the arm 1 and corresponding surfaces on the other side. The gradually decreasing radius of curvature causes the leading edge of the film to double back on itself in a coil as shown in FIG. 1. Note that the radius of curvature of the extension member 6 is less than that of the arm 1 and the surface of the guide roller 12 extends inside the guide surface 6' of the extension 6 so there is no chance of the leading edge of the film taking a reverse curvature around the rollers 12 which would cause crushing, jamming and damage to the film. The extension member 6 is spring loaded sufficiently to hold the film in a relatively tight loop but adapted to yield as the coil becomes larger.

After the film has been completely run through the projector the remainder may be pushed into the coil and the coiled film in the takeup means may be easily removed by grasping the edge of the film with the fingers and lifting the knob 14, thereby lifting extension member 6. Both sides of the film takeup are open so that the film may be removed with a minimum of difficulty. It is not necessary to rewind the film out of the takeup means.

Many modifications may be made by those who desire to practice the invention without departing from the scope thereof which is defined by the following claim.

I claim:

Open sided film takeup means adapted for easy removal of film from a strip film projector comprising a lower guide arm fixedly connected to said projector and having raised edges on each side to support the edges of a film, said arm extending downwardly and outwardly and then extending upwardly, the interior surface of said arm being a first smooth curve, an extension member pivotally mounted on the upper end of said arm, the interior surface of said extension member having a second curve of smaller radius than said first curve, a spring connected to said extension member to load said extension member down, edge roller means connected to said arm, said roller means being arranged to contact the outer edges of a film to thereby protect the center film surface from scratching, edge roller means connected to the free end of said extension member, the surface of said roller means extending inside the interior curvature of said extension member, the ends of said edge roller means being bevelled to provide side guidance to said film, and means to lift said extension member to facilitate easy removal of said film when coiled.

References Cited in the file of this patent

UNITED STATES PATENTS

| | | |
|---|---|---|
| 931,996 | Colpitts | Aug. 24, 1909 |
| 1,097,721 | Koch | May 26, 1914 |
| 2,092,159 | Hasbrouck et al. | Sept. 7, 1937 |
| 2,144,622 | Frost | Jan. 24, 1939 |
| 2,336,278 | Mihalyi | Dec. 7, 1943 |
| 2,614,763 | Horton et al. | Oct. 21, 1952 |